(12) United States Patent
Manger et al.

(10) Patent No.: US 10,030,786 B2
(45) Date of Patent: Jul. 24, 2018

(54) ADJUSTABLE DAMPING VALVE ARRANGEMENT

(71) Applicants: Thomas Manger, Wasserlosen (DE);
Stefan Schmitt, Gochsheim (DE);
Lukas Ruhmann, Gremsdorf (DE)

(72) Inventors: Thomas Manger, Wasserlosen (DE);
Stefan Schmitt, Gochsheim (DE);
Lukas Ruhmann, Gremsdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 113 days.

(21) Appl. No.: 14/488,590

(22) Filed: Sep. 17, 2014

(65) Prior Publication Data

US 2015/0076376 A1 Mar. 19, 2015

(30) Foreign Application Priority Data

Sep. 18, 2013 (DE) ........................ 10 2013 218 658

(51) Int. Cl.
*F16K 1/42* (2006.01)
*F16K 31/06* (2006.01)
*F16K 47/00* (2006.01)
*F16F 9/34* (2006.01)
*F16F 9/46* (2006.01)

(52) U.S. Cl.
CPC ........ *F16K 31/0696* (2013.01); *F16F 9/3405* (2013.01); *F16F 9/46* (2013.01); *F16K 47/00* (2013.01)

(58) Field of Classification Search
CPC .. F16K 31/0696; F16K 47/00; F16K 31/0655;
F16K 1/36; F16K 1/42; F16K 27/029;
F16F 9/3405; F16F 9/46; F16F 9/464;
F16F 9/34; F16F 9/465
USPC ....... 251/54, 64, 30.05, 30.04, 30.03, 30.02,
251/30.01; 137/614.11;
188/266.2–266.6, 283, 283.1, 313–320,
188/322.13, 322.15
See application file for complete search history.

(56) References Cited

U.S. PATENT DOCUMENTS

| | | | | |
|---|---|---|---|---|
| 4,880,086 A | * | 11/1989 | Knecht | F16F 9/465 188/266.6 |
| 5,078,240 A | * | 1/1992 | Ackermann | F16F 9/465 188/282.2 |
| 5,398,787 A | * | 3/1995 | Woessner | B60G 17/08 188/266.6 |
| 5,915,665 A | * | 6/1999 | Paese | E03C 1/04 251/30.04 |
| 6,000,508 A | * | 12/1999 | Forster | F16F 9/46 188/299.1 |
| 6,044,939 A | * | 4/2000 | Forster | F16F 9/50 188/266.6 |
| 6,135,250 A | * | 10/2000 | Forster | F16F 9/46 188/266.5 |
| 6,290,203 B1 | * | 9/2001 | Kolze | F16K 31/402 251/30.02 |

(Continued)

*Primary Examiner* — Craig J Price
*Assistant Examiner* — Andrew J Rost
(74) *Attorney, Agent, or Firm* — Cozen O'Connor

(57) ABSTRACT

An adjustable damping valve arrangement for a vibration damper includes a main stage valve with a main stage valve body which is guided in a damping valve housing so as to be axially movable. The damping valve housing has a housing insert which is separate from the damping valve housing and in which the main stage valve body is guided.

7 Claims, 2 Drawing Sheets

(56) References Cited

U.S. PATENT DOCUMENTS

| | | | | |
|---|---|---|---|---|
| 7,703,740 | B1* | 4/2010 | Franklin | F16K 31/404 |
| | | | | 251/129.21 |
| 9,599,183 | B2* | 3/2017 | Kamakura | F16F 9/464 |
| 2008/0078634 | A1* | 4/2008 | Heyn | F16F 9/46 |
| | | | | 188/266.5 |
| 2013/0263943 | A1 | 10/2013 | Foerster | |

* cited by examiner

ADJUSTABLE DAMPING VALVE ARRANGEMENT

BACKGROUND OF THE INVENTION

1. Field of the Invention

The present invention is directed to an adjustable damping valve arrangement having a main stage valve with a main stage valve body which is guided in a damping valve housing so as to be axially moveable.

2. Description of the Related Art

An adjustable damping valve arrangement known from US 2013/263943 A1 comprises a preliminary stage valve and a main stage valve. The main stage valve has a main stage valve body which is guided in a housing so as to be axially movable. The main stage valve body and the housing form a control space for the main stage valve, and the pressure level in the control space is adjusted by the preliminary stage valve. Consequently, the annular gap between the inner wall of the housing and an outer lateral surface of the main stage valve body must be very closely toleranced. While the annular gap can be closed by a seal, it nevertheless requires very precise fabrication.

The main stage valve body has a central axial guide shaft which projects into a through-opening of an intermediate wall and forms the preliminary stage valve with a preliminary stage valve body. The through-opening must also be manufactured in a very precise manner.

The housing has a quantity of radial openings, and damping medium coming from the main stage valve flows through these radial openings. Above the aforementioned intermediate wall, a plurality of radial outlet openings are formed in the housing for the preliminary stage valve.

Radial openings are basically difficult to produce. When produced by cutting, additional difficulties arise in deburring the radially inwardly directed ends of the radial openings. On the whole, the housing turns out to be very difficult to produce.

It is thus an object of the present invention to provide a damping valve arrangement in which the manufacturing problems known from the prior art are overcome.

SUMMARY OF THE INVENTION

This object is met according to the invention in that the damping valve housing has a housing insert which is separate from the damping valve housing and in which the main stage valve body is guided.

The great advantage consists in that a housing area that must be produced very precisely can now be produced as an individual part much more simply and precisely than the corresponding geometry in a damping valve housing which is known per se. The housing insert can be produced, e.g., by sintering techniques, and a component part is obtained which requires no after-machining steps. There is also the possibility of producing the housing insert from plastic.

In a further advantageous embodiment, surfaces of the damping valve housing and of the housing insert which face one another form at least one flow channel for a damping medium volume flow inside the damping valve arrangement. The dividing joint between the two component parts is purposely utilized as flow channel. In this way, laborious cutting machining steps, particularly radial bores, can be dispensed with.

In addition, the housing insert can have a profile forming the at least one flow channel on the outer side. As a rule, an outer profile can be produced, particularly deburred and cleaned, in a particularly simple manner.

According to an advantageous embodiment, at least one through-channel is formed radially outwardly of a main stage valve seat surface and is arranged radially inwardly of the damping valve housing, and the flow channel is connected to the at least one through-channel. The great advantage of this solution consists in that the damping valve housing can be used as a closed cartridge because the flow connections and flow channels all run within the damping valve housing.

The housing insert is fixed in a simple manner in that the main stage valve seat face is formed by a valve insert via which the housing insert is positioned axially in the damping valve housing. In practice, the valve insert forms a kind of cover for the damping valve housing.

In addition, the housing insert can be pre-loaded axially against a supporting surface of the damping valve housing by a spring element.

For purposes of simple assembly, the spring element is supported at the valve insert.

In a preferred embodiment, the main stage valve is controlled by a preliminary stage valve, and a control space of the preliminary stage valve is formed by the housing insert. Accordingly, a further function of the damping valve housing is shifted to the housing insert. Therefore, an intermediate wall which was necessary heretofore at the damping valve housing can be dispensed with.

The housing insert is constructed in a pot-shaped manner. The pot shape can be produced simply and offers high component strength.

Further, it is possible that the main stage valve body has a guide shaft which is guided in an opening of the housing insert. All of the guide surfaces and/or sealing surfaces crucial to the function of the main stage valve body are formed at an individual component part.

A particularly great advantage is achieved in that the damping valve housing has a basic tubular shape. The basic tubular shape likewise offers great advantages because a single assembly direction can be realized by corresponding dimensioning of the valve components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully referring to the following description of the drawings in which.

DETAILED DESCRIPTION OF THE PRESENTLY PREFERRED EMBODIMENTS

Figure 1:
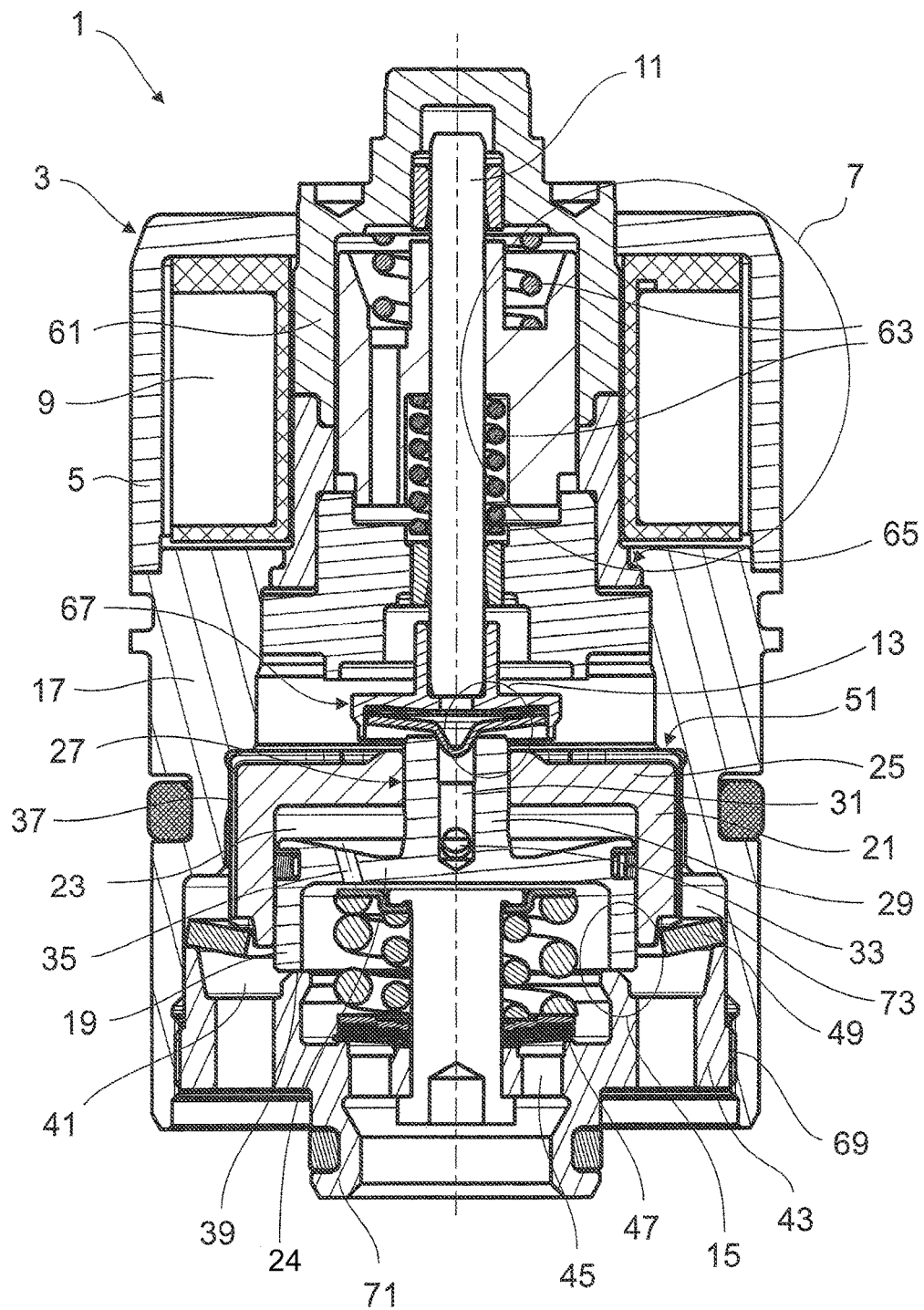
FIG. 1 is a sectional view through a damping valve arrangement.

FIG. 1 shows a damping valve arrangement 1 with a damping valve housing 3 for a vibration damper of any constructional type, which damping valve housing 3 is divided in two axially. In the present embodiment, the damping valve arrangement 1 is provided for arrangement externally with respect to an outer cylinder of the vibration damper, but the principle of construction can easily be adapted to a damping valve arrangement 1 on a piston rod, for example. An actuator 7, known per se, comprising a coil 9 which acts on a preliminary stage valve 13 via an armature 11 is arranged in a first damping valve housing portion 5. A main stage valve 15 generating the damping force in the vibration damper is controlled by the preliminary stage valve 13. The preliminary stage valve 13 and main stage valve 15 are arranged in second damping valve housing portion 17 which has a basic tubular shape without an intermediate wall.

The main stage valve 15 comprises a main stage valve body 19 which is guided so as to be axially movable in a housing insert 21 which is separate from the damping valve housing 3. The housing insert 21 is pot-shaped and forms a control space 23 via which the main stage valve 15 is controlled by the preliminary stage valve 13. A base 25 of the housing insert 21 has an opening 27 in which a guide shaft 29 of the main stage valve body 19 is guided. An axial channel 31 and a transverse channel 33 extend in the guide shaft 29 and connect the control space 23 to the preliminary stage valve 13 via a passage 35 in the base 24.

Figure 2:
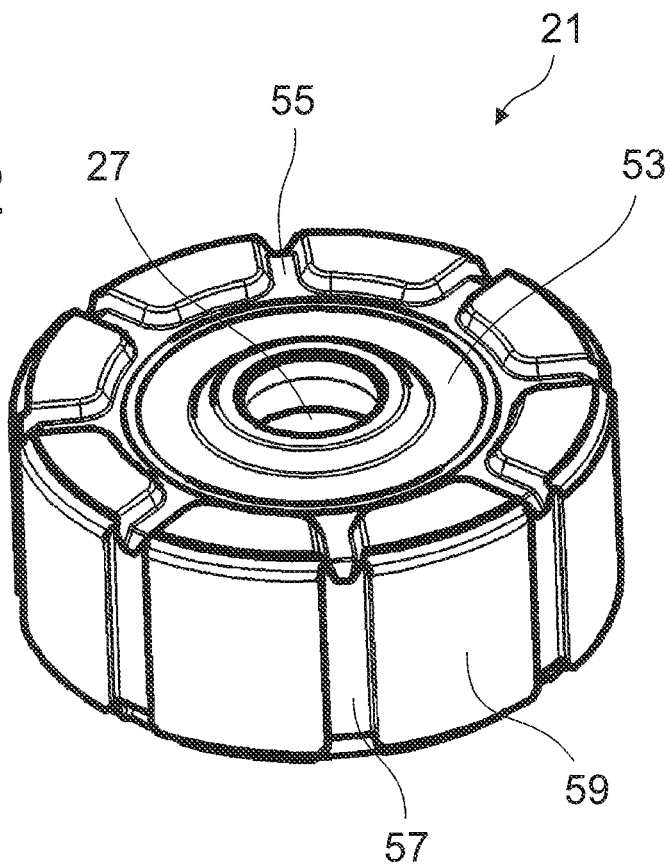
FIGS. 2 and 3 show a housing insert in two perspective views.
Figure 3:
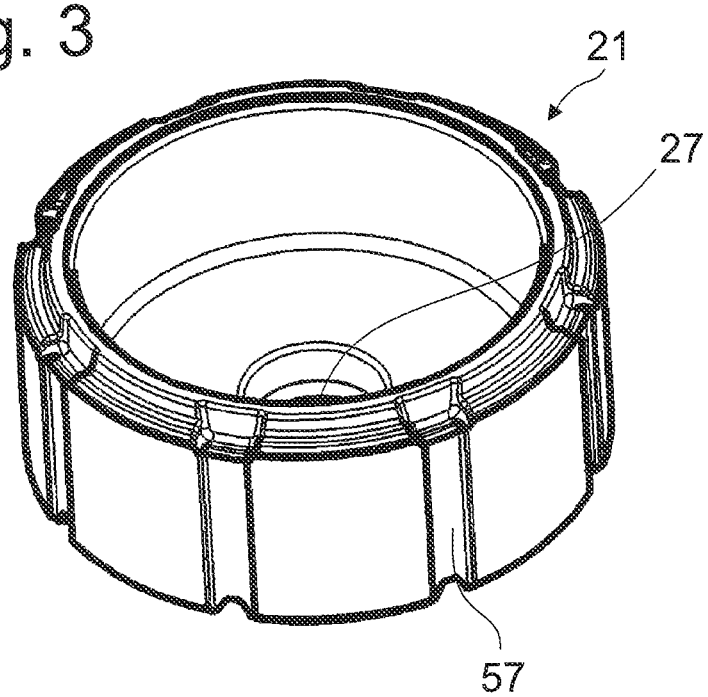

As is illustrated by combined reference to FIGS. 1 to 3, the housing insert 21 is profiled on the outer side. Accordingly, surfaces of the damping valve housing 3 and of the housing insert 21 which face one another form at least one flow channel 37 for a damping medium volume flow within the damping valve arrangement 1.

The main stage valve 15 is formed as a seat valve such that the main stage valve body 19 is supported on a main stage valve seat surface 39. There is formed radially outwardly of the main stage valve seat surface 39 at least one through-channel 41 which is disposed radially inwardly of the damping valve housing 3. The flow channel 37 provided at the outer side of the housing insert 21 is connected to the at least one through-channel 41.

The main stage valve seat surface 39 is in turn formed by a valve insert 43 via which the housing insert 21 is positioned axially in the damping valve housing 3. In the present embodiment form, the valve insert 43 has damping channels 45 which cooperate with at least one valve disk 47. However, this is a matter of another option.

The housing insert 21 is pre-loaded axially against a supporting surface 51 of the damping valve housing 3 by a spring element 49 constructed as a disk spring. The spring element 49 is supported in turn at the valve insert 43.

FIGS. 2 and 3 show the housing insert 21 as an individual part in different external views. A central annular channel 53 to which a plurality of radial channels 55 are connected can be seen in the top view. These radial channels 55 pass into axial grooves 57 in an outer lateral surface 59 of the housing insert. When the radial channels 55 and axial grooves 57 are produced in a pressing process without cutting, for example, it is useful to provide as many channels 55 and grooves 57 as possible and to make them as flat as possible so as to minimize the dimensional deviations brought about in the housing insert 21 as a result of the production process.

As can be seen from FIG. 1, the second damping valve housing portion 17 is not only tubular but is also formed with a stepped inner contour which increases in size without discontinuities starting from a first end at the actuator 7 in direction of a second end in the region of the valve insert 43.

This makes it possible for assembly to be carried out in one assembly direction via the large opening at the second end.

During assembly, a back-iron member 61 with armature 11, including a spring arrangement 63 of the actuator 7, is first inserted into the second damping valve housing portion 17 via the second end. The back-iron member 61 is supported at a circumferential projection 65 which represents the smallest inner diameter of the tubular body. A preliminary stage valve body 67 is then placed on the armature 11.

In a further assembly step, the housing insert 21 is inserted and, in its end position, contacts the supporting surface 51 of the second damping valve housing portion 17. In the next assembly step, the main stage valve body 19 is possibly inserted into the housing insert 21, followed by the spring element 49. The damping valve housing 3 is terminated by the valve insert 43 which is fastened, e.g., by means of a threaded connection 69, to the second damping valve housing portion 17.

In a working movement of the vibration damper, damping medium is displaced into the damping valve arrangement 1 via a pipe connection 71 of the valve insert 43. The damping medium passes the at least one damping channel 45 and the at least one valve disk 47. Accordingly, a lifting force acts on the main stage valve body 19. The damping medium arrives in the control space 23 via the passage 35 and accordingly exerts a closing force on the main stage valve body 19. The preliminary stage valve 13 controls an outlet cross section from the control space 23 into the flow channel 37 between the housing insert 21 and the second damping valve housing portion 17. The outflowing damping medium reaches an annular space 73 between the second damping valve housing portion 17 and the valve insert 43 and the damping medium of the preliminary stage valve 13 flows out via the at least one through-channel 41 of the annular space 73.

During a lifting movement of the main stage valve body 19 from its main stage valve seat surface 39, damping medium flows radially outward and likewise flows out of the damping valve housing 3 via the at least one through-channel 41. The damping medium then flows into a compensating space or working space, not shown.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An adjustable damping valve arrangement (1) for a vibration damper, comprising:
 a damping valve housing (3) and a housing insert (21) mounted within said damping valve housing (3);
 a main stage valve (15) and a main stage valve body (19);
 a preliminary stage valve (13) for controlling said main stage valve (15), said housing insert (21) separate from said damping valve housing (3), said housing insert (21) comprising a base (25) proximate said preliminary stage valve (13) and a sidewall axially extending away from said base (25) and from said preliminary stage valve (13) for axially guiding said main stage valve body (19) within said housing insert (21);

wherein said damping valve housing (3) and said housing insert (21) comprise surfaces which face one another to form at least one flow channel (37) for a damping medium volume flow inside the damping valve arrangement (1);

wherein said housing insert (21) has an opening (27); and said main stage valve body (19) comprises a guide shaft (29) guided in said opening (27) of said housing insert (21);

a control space (23) formed between said housing insert (21) and said main stage valve body (19); and a channel (31) within said guide shaft (29) opening into said control space (23), said at least one flow channel formed by an axially extending groove (57) within an outer lateral surface of said axially extending sidewall opposite and adjacent said damping valve housing (3);

a central annular channel (53) in said base (25) of said housing insert (21) surrounding said opening (27); and at least one radial groove (55) connecting said axially extending groove (57) with said central annular channel (53).

2. The adjustable damping valve arrangement according to claim 1, additionally comprising a valve insert (43) separate from said damping valve housing (3) forming a main stage valve seat surface (39) and at least one through-channel (41) formed in said valve insert (43) radially outwardly of said main stage valve seat surface (39) and arranged radially inwardly of said damping valve housing (3); and wherein said flow channel (37) is connected to the at least one through-channel (41).

3. The adjustable damping valve arrangement according to claim 2, wherein said valve insert (43) is constructed for positioning said housing insert (21) axially in said damping valve housing (3).

4. The adjustable damping valve arrangement according to claim 3, additionally comprising a spring element (49) disposed between said valve insert (43) and said housing insert (21); and wherein said spring element (49) is supported at said valve insert (43).

5. The adjustable damping valve arrangement according to claim 1, additionally comprising a spring element (49) disposed between the valve insert (43) and said housing insert (21); and wherein said housing insert (21) is preloaded axially against a supporting surface (51) of said damping valve housing (3) by said spring element (49).

6. The adjustable damping valve arrangement according to claim 1, wherein said housing insert (21) is constructed in a pot-shaped manner.

7. The adjustable damping valve arrangement according to claim 1, wherein said damping valve housing (3) has a basic tubular shape.

* * * * *